United States Patent
Beer et al.

(10) Patent No.: US 7,210,449 B2
(45) Date of Patent: May 1, 2007

(54) METHOD FOR CONTROLLING AN INTERNAL COMBUSTION ENGINE OPERATING WITH DIRECT FUEL INJECTION

(75) Inventors: Johannes Beer, Regensburg (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/537,603

(22) PCT Filed: Sep. 29, 2003

(86) PCT No.: PCT/DE03/03244

§ 371 (c)(1),
(2), (4) Date: Jul. 6, 2006

(87) PCT Pub. No.: WO2004/051067

PCT Pub. Date: Jun. 17, 2004

(65) Prior Publication Data

US 2006/0278196 A1 Dec. 14, 2006

(30) Foreign Application Priority Data

Dec. 3, 2002 (DE) ................................. 102 56 474

(51) Int. Cl.
*F02D 41/40* (2006.01)
*F02B 3/04* (2006.01)
(52) U.S. Cl. .................................... 123/299; 123/90.16
(58) Field of Classification Search ............. 123/90.11, 123/90.15, 90.16, 295, 299, 300, 435, 568.14
See application file for complete search history.

(56) References Cited

U.S. PATENT DOCUMENTS

| 5,313,920 | A * | 5/1994 | Matsushita | 123/295 |
| 6,267,097 | B1 * | 7/2001 | Urushihara et al. | 123/299 |
| 6,386,177 | B2 * | 5/2002 | Urushihara et al. | 123/299 |
| 6,505,603 | B1 * | 1/2003 | Schray et al. | 123/299 |
| 6,748,919 | B2 * | 6/2004 | Abo et al. | 123/299 |

FOREIGN PATENT DOCUMENTS

| DE | 100 65 266 A1 | 7/2002 |
| EP | 0 539 921 A2 | 5/1993 |
| EP | 1 052 391 A2 | 11/2000 |
| WO | WO 00/52317 | 9/2000 |

* cited by examiner

Primary Examiner—T. M. Argenbright

(57) ABSTRACT

Disclosed is a method, according to which the air fed to the combustion chambers of an internal combustion engine is pre-compressed by means of a boosting device, particularly an exhaust gas turbocharger. The valve overlap of the gas exchange valves of the internal combustion engine is adjusted by variably displacing the camshaft. The quantity of fuel to be injected, which is required for homogeneously operating the internal combustion engine, is determined and injected directly into the combustion chambers of the internal combustion engine, the total quantity of fuel to be injected being divided into two partial quantities. A first partial quantity is injected into the intake stroke while a second partial quantity is injected into the compression stroke. The ratio at which the two partial quantities are divided is defined according to the load range of the internal combustion engine.

11 Claims, 2 Drawing Sheets

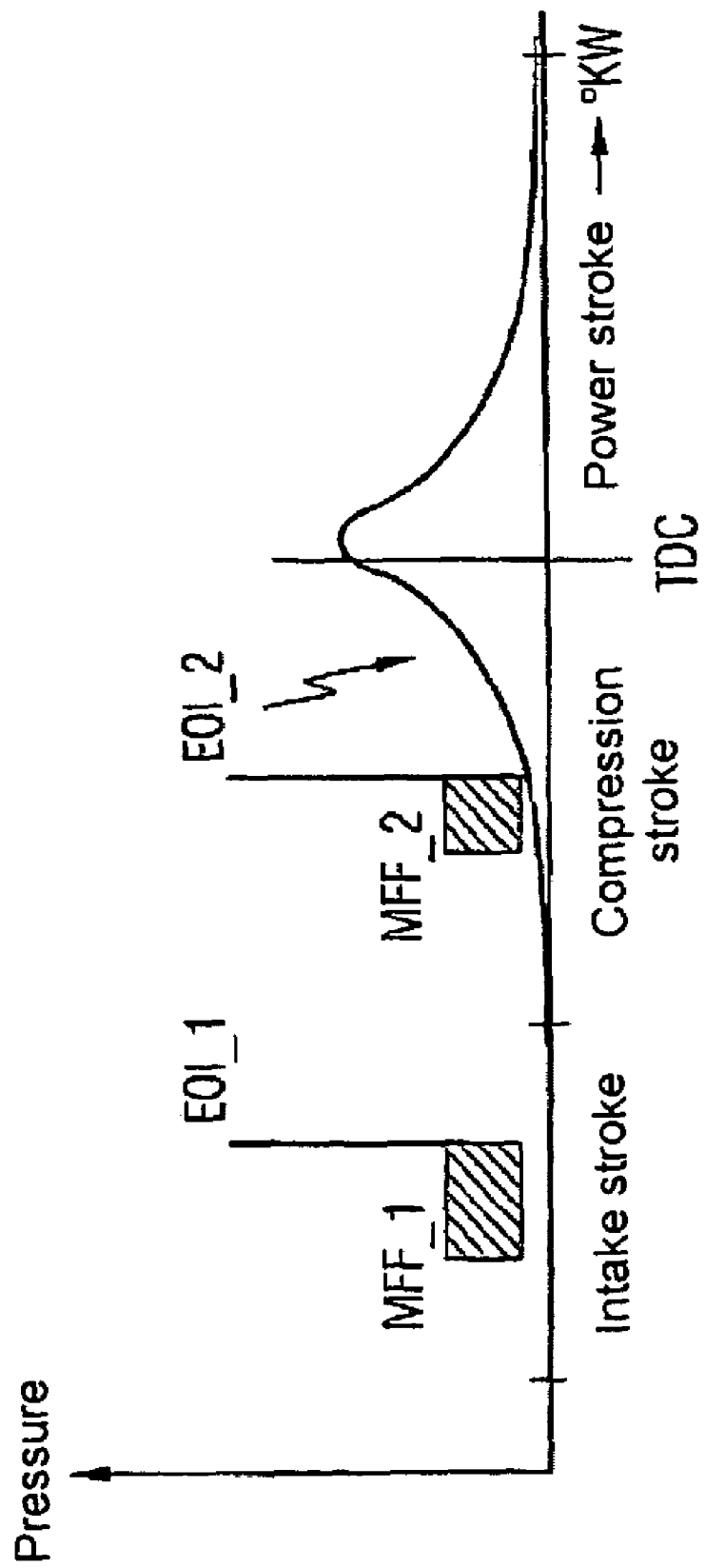

METHOD FOR CONTROLLING AN INTERNAL COMBUSTION ENGINE OPERATING WITH DIRECT FUEL INJECTION

CROSS REFERENCE TO RELATED APPLICATION

This application is the US National Stage of International Application No. PCT/DE2003/003244, filed Sept. 29, 2003 and claims the benefit thereof. The International Application claims the benefits of German Patent applications No. 10256474.4 DE filed Dec. 3, 2002, all of the applications are incorporated by reference herein in their entirety.

FIELD OF THE INVENTION

The invention relates to a method for controlling an internal combustion engine provided with a boosting device and operating with direct fuel injection.

BACKGROUND OF THE INVENTION

Internal combustion engines operating with direct injection (DI: direct injection) offer high potential for reducing fuel consumption with relatively low pollutant emissions. In contrast to intake manifold injection, with direct injection fuel is injected under high pressure directly into the combustion chambers of the internal combustion engine.

Injection systems having a central accumulator (common rail) are known for this purpose. In common rail systems of said type, a fuel pressure regulated via a pressure sensor and a pressure regulator by the electronic control device of the internal combustion engine is built up in the common rail by means of a high-pressure pump, which fuel pressure is available largely independently of the engine speed and the quantity of fuel injected. The fuel is injected into the combustion chamber via an electrically controllable injector. This receives its signals from the control device. Through the functional separation of pressure generation and fuel injection, the injection pressure can be selected substantially freely independently of the current working point of the internal combustion engine.

For enhancing the performance and torque of internal combustion engines it is known how to provide a boosting facility that increases the charging quantity through precompression, with a charger conveying fresh air into the cylinder of the internal combustion engine. With mechanical boosting the compressor is driven directly by the internal combustion engine (compressor boosting, for instance), whereas with exhaust gas boosting a turbine (exhaust gas turbine) to which the exhaust gas of the internal combustion engine is applied drives a compressor located in the intake manifold of the internal combustion engine.

To reduce the charge-changing losses, modern internal combustion engines have variable valve drives with single- and multi-stage or continuous variability. The variable valve control of the intake and exhaust valves offers the possibility of setting the valve control times within the physical limits of the existing actuator principle (mechanical system, hydraulic system, electrical system, pneumatic system, or a combination of the cited systems) more or less freely. Savings in consumption, lower raw emissions and a higher torque can be achieved as a result.

SUMMARY OF THE INVENTION

The object of the invention is to disclose a method by means of which the operating mode of an internal combustion engine driven by means of boosting, operating with direct fuel injection and having a variable valve drive can be improved.

Said object is achieved by means of a method as defined in the claims.

Advantageous developments of the method according to the invention are the subject of the subclaims.

According to the inventive method, the air fed to the combustion chambers of the internal combustion engine is precompressed by means of a boosting device (25, 26) and the valve overlap of the gas exchange valves of the internal combustion engine is adjusted by means of a variable camshaft displacement. The quantity of fuel requiring to be injected for the homogeneous operation (lambda=1 operation) of the internal combustion engine is determined and injected directly into the combustion chambers of the internal combustion engine, with said quantity of fuel to be injected being divided into two partial quantities. A first partial quantity is injected into the intake stroke and a second partial quantity is injected into the compression stroke. The ratio with which the two partial quantities are divided is determined as a function of the load range of the internal combustion engine.

In the case of a spark ignition engine operated with a homogeneous mixture and having direct fuel injection, referred to below for simplicity as a DI spark ignition engine, the achievable performance and the fuel consumption can be positively influenced by dividing the total quantity of fuel to be injected—in each case a partial injection into the intake stroke and into the compression stroke.

The second injected quantity injected into the compression stroke takes vaporization heat from the mixture which, by way of reducing the charging temperature at the instant of ignition, reduces the maximum combustion temperature and hence also the tendency toward knocking combustion. The ignition angle can in this way be displaced in an "early direction" into higher engine efficiency ranges.

When working close to full load, a boosted DI internal combustion engine operated with a homogeneous mixture ($\lambda$=1) furthermore offers the possibility of injecting scavenging fresh air directly into the exhaust manifold. Prerequisites for this are a positive pressure drop between the intake and exhaust side at the instant of charge-changing TDC (Top Dead Center) as well as sufficient valve overlap between the intake and exhaust valve.

Directly injecting fuel into the combustion chamber of the cylinders ensures that injection will start after the exhaust valve has closed. This means that only fresh air without any fuel is used for scavenging the exhaust side.

Through the additional scavenging air, the mass flow through the turbine is increased in the case of an exhaust gas turbocharger, as a result of which the transient behavior and also the achievable maximum performance increases. Owing to the enhanced turbine performance, the compressor coupled to the turbine will also convey a greater quantity of air, the limit here being set by what is termed the absorption characteristic of the internal combustion engine.

BRIEF DESCRIPTION OF THE DRAWINGS

The method according to the invention is explained in more detail below with reference to an example.

FIG. 2 is a diagram of the curve of the pressure in the cylinder as a function of the crankshaft angle.

DETAIL DESCRIPTION OF THE INVENTION

Figure 1:
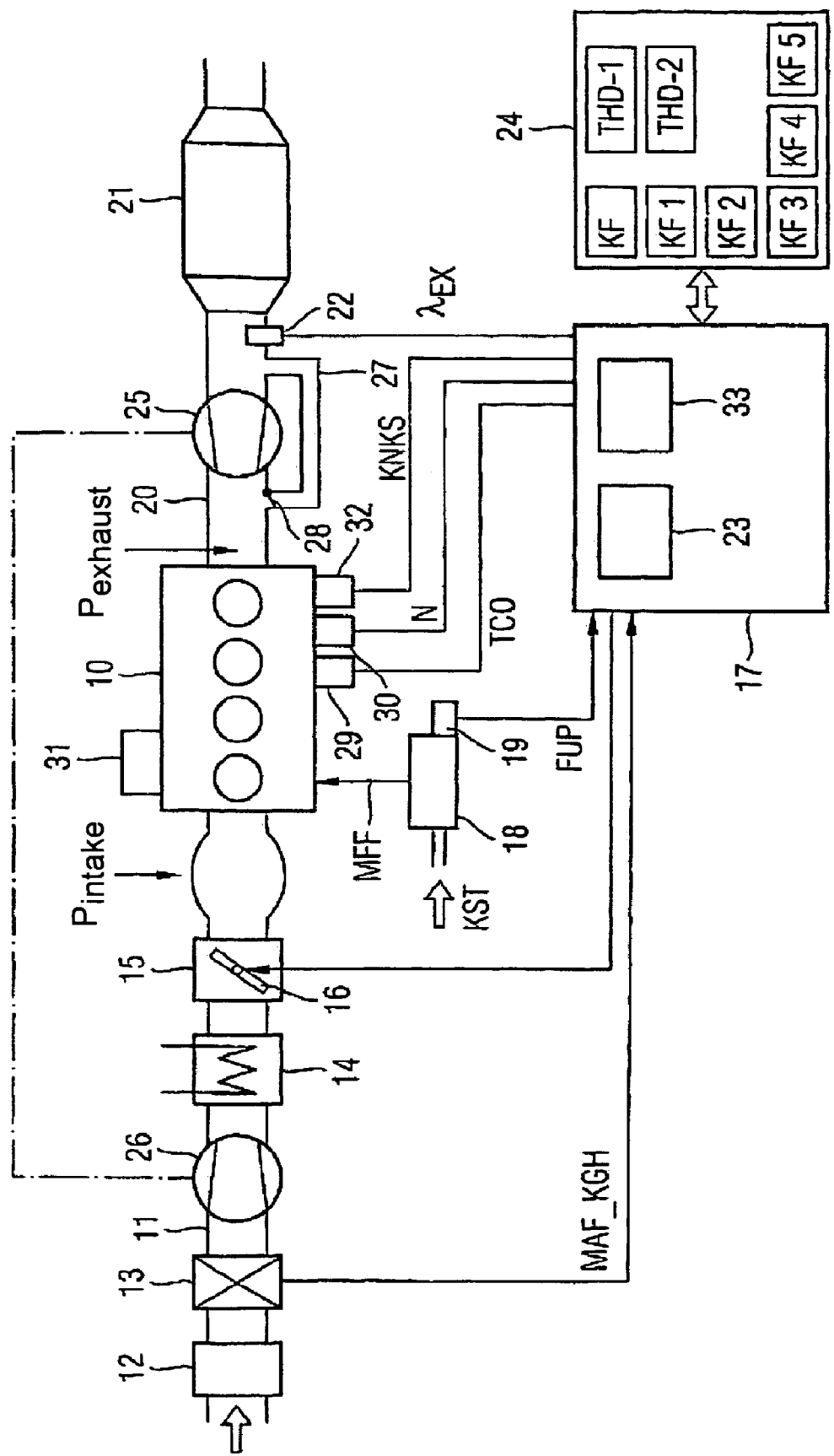
FIG. 1 is a greatly simplified block diagram of a boosted internal combustion engine that operates with direct fuel injection to which the method according to the invention is applied.

FIG. 1 shows, in the form of a block diagram, a boosted spark ignition internal combustion engine 10 having direct fuel injection and having an exhaust gas post-treatment system assigned thereto, with only those components being shown which are necessary for understanding the invention. In particular the ignition system, fuel circuit and cooling cycle are not shown.

The internal combustion engine 10 receives the fresh air necessary for combustion via an intake duct 11. Said fresh air fed to it flows through an air filter 12, an air mass meter 13 and a charging air cooler 14 to a throttle valve block 15. Said throttle valve block 15 contains a throttle valve 16 and a throttle valve sensor (not shown) which supplies a signal corresponding to the aperture angle of the throttle valve 16. The throttle valve 16 is, for example, an electric motor-driven throttle element (E-Gas) whose aperture cross-section can be set, apart from through actuation by the driver (driver request), as a function of the operating range of the internal combustion engine via corresponding signals of a control facility 17. The air mass meter 13 serves in the case of what is termed air mass-prompted controlling of the internal combustion engine as a load sensor whose output signal MAF_KGH is fed to the control facility 17 for further processing.

The internal combustion engine 10 has a fuel metering device 18 to which fuel KST is fed under high pressure and which contains a number of injection valves that correspond to the number of cylinders of the internal combustion engine and which are driven via corresponding signals of injection end-stages preferably integrated in the electronic control facility 17 of the internal combustion engine. Fuel is injected directly into the cylinders of the internal combustion engine 10 via the injection valves, with said valves being advantageously supplied with fuel from a fuel accumulator (common rail). The quantity of fuel injected by an injection valve is referred to as MFF. A pressure sensor 19 on the fuel metering device 18 registers the fuel pressure FUP at which the fuel is directly injected into the cylinders of the internal combustion engine.

The internal combustion engine 10 is connected at the output side to an exhaust gas duct 20 in which is located a catalytic exhaust gas converter 21 that can be provided as a three-way catalytic converter or a NOx storage catalytic converter, or as a combination of the two. The sensor system for the post-treatment of exhaust gas includes, inter alia, an exhaust gas measurement detector in the form of a lambda probe 22 located upstream of the catalytic exhaust gas converter 21.

The mixture is regulated in accordance with the pre-defined reference values by the signal $\lambda_{Ex}$ of the lambda probe 22. This function is performed by a lambda regulating device 23, known per se, which is preferably integrated in the control facility 17 controlling or, as the case may be, regulating the operation of the internal combustion engine. Electronic control facilities 17 of this type that as a rule include one or more microprocessors and which, apart from injecting fuel and regulating ignition, perform a large number of other controlling and regulating functions, are known per se, so that only the physical structure of relevance to the invention and the functioning mode of said structure will be dealt with below. The control facility 17 is in particular connected to a storage device 24 in which are stored, inter alia, various ignition maps and threshold values whose meaning will be explained below.

To increase the filling of the cylinders and hence to enhance the performance of the internal combustion engine 10, a boosting device in the form of an exhaust gas turbo-charger, known per se, is provided whose turbine 25 is located in the exhaust gas duct 20 and operates via a shaft, indicated by a dashed line but not further referenced, in conjunction with a compressor 26 in the intake duct 11. The exhaust gasses thus drive the turbine 25 and this in turn drives the compressor 26. Said compressor handles the intake and supplies the internal combustion engine with a precompressed fresh charge. The charging air cooler 14 located downstream of the compressor 26 dissipates the compression heat via the coolant cycle of the internal combustion engine. Filling of the cylinders can thereby be further improved. Provided parallel to the turbine 25 is a bypass line 27 that can be opened to different widths via what is termed a waste gate 28. A varying portion of the mass flow from the internal combustion engine is routed thereby past the turbine 25 so that the compressor 26 of the exhaust gas turbocharger is driven with a varying degree of force.

A temperature sensor 29 registers a signal corresponding to the temperature of the internal combustion engine, as a rule the coolant temperature TCO. A speed sensor 30 registers the speed N of the internal combustion engine. Both signals are routed to the control facility 17 for further processing.

A knocking sensor 32 registers the characteristic knocking oscillation in the combustion chamber and supplies a corresponding signal KNKS to a knocking regulating device 33 preferably integrated in the control facility 17. A number of knocking sensors corresponding to the number of cylinders of the internal combustion engine 10 or only a single knocking sensor can be provided.

The internal combustion engine 10 furthermore has a device 31 with the aid of which the valve overlap of the intake valves and exhaust valves can be set and changed. Variable valve controls of this type can be implemented using mechanical systems, hydraulic systems, electrical systems or pneumatic systems, or a combination of the cited systems, with its being possible to distinguish between what are termed fully variable (continuous) valve drives and systems having valve drives that can be set in stages.

The quantity, required for combustion, of fuel to be injected MFF is conventionally calculated from a load parameter, namely the mass of air taken in MAF_KGH and the engine speed N, and is subjected to several correction operations (influence of temperature, lambda regulator, etc.).

The total thus determined quantity of fuel to be injected MFF is divided into two injection operations. A first quantity of fuel MFF_1 is injected into the intake stroke whereas a second quantity of fuel MFF_2 is injected into the compression stroke. The following applies: MFF=MFF_1+MFF_2.

This operation is shown in FIG. 2 for a selected cylinder. The diagram shows the pressure curve in a cylinder of a 4-stroke spark ignition internal combustion engine as a function of the crankshaft angle in °KW. The intake stroke, the compression stroke and the power stroke are additionally drawn on the abscissa. The exhaust stroke has been omitted. The end of injection into the intake stroke is referenced with EOI_1; the end of injection into the compression stroke is referenced with EOI_2. The top dead center is referenced with TDC (Top Dead Center).

With a suitably selected end-of-injection EOI_1, the first quantity of fuel to be injected MFF_ provides for fuel evaporation while fresh air is flowing into the cylinder. The heat necessary for fuel evaporation is taken from the air flowing in, as a result of which the delivery level is increased by way of an increase in charging density. There will be the maximum delivery level if the total quantity of fuel MFF is injected with the first injection.

With a suitably adjusted end-of-injection EOI_2, the quantity of fuel MFF_2 injected during the compressor stroke takes heat from the air-fuel mixture in the compression phase through evaporation. The charging temperature falls at the instant of ignition and, as a result, so does the maximum combustion temperature. The tendency to knock reduces through the reduction in maximum combustion temperature and an ignition angle can be set for a more favorable focal point for combustion (early instant of ignition). Increasing the quantity of fuel MFF_2 up to the limits set by mixture preparation times increases the effect of internal charge cooling. Only relatively short mixture preparation times are available for injection into the compression stroke. Combustion efficiency is poor if too much fuel is injected here because the fuel is unable to burn completely and high CO emissions and smoking will occur. The limits for this are determined as a function of the working point by trials and filed in corresponding ignition maps.

The ratio between MFF_1 and MFF_2 can be set in such a way as to allow advantages to be gained from both effects and thereby optimize the maximum performance and consumption.

When a boosted internal combustion engine is working close to full load, the effect—with a corresponding valve overlap—of the positive difference in pressure between the intake side and exhaust side ($P_{intake} > P_{exhaust}$) is that scavenging fresh air will be flushed toward the exhaust gas side. The mass of this scavenging air will increase the throughput rate through the internal combustion engine without participating in the combustion process. The term "scavenging" is understood to mean the effect of fresh air's being forced through the internal combustion engine without participating in the combustion process in the cylinder. There will be, in particular, the following advantages for the operating characteristics of the internal combustion engine:

When $\lambda_{exhaust\_gas}=1$ (homogeneous operation of the internal combustion engine), combustion in the cylinder will take place at $\lambda_{cylinder}<1$ with scavenging air present. The tendency to knock will be reduced by rich combustion.

The portion of residual gas in the combustion chamber, and hence the tendency to knock, is reduced by scavenging. Minimizing of the portion of residual gas is of decisive significance in full-load operation in order to achieve maximum filling of the cylinders and also to turn said filling to effective practical account, which is to say with a favorable focal point for combustion.

The additional quantity of scavenging air will increase the mass flow through the turbine, as a result of which both sparkover performance (avoidance of the so-called 'turbo hole') and the achievable full load can be increased with a low internal combustion engine speed.

The ratio between the mass of air remaining in the cylinder and the total mass of air taken in during a working cycle is referred to as the trapping efficiency TE:

$$TE = \frac{\text{Mass of air cylinder}}{\text{Total mass of air taken in}} = \frac{M_{Cyl}}{M_{Cyl} + M_{Scav}}$$

The total mass of air taken in comprises the mass of air $M_{Cyl}$ remaining in the cylinder and the mass of scavenging air $M_{Scav}$, which is to say the mass of air that is flushed through the cylinder. It follows from relationship (1) that TE≦1. The greater the mass of scavenging air $M_{Scav}$ is, the smaller will be the value for TE. This means to say that the air mass meter 13 (FIG. 1) measures the total mass of air taken in overall but which is then divided via the trapping efficiency TE into a mass of air participating in the combustion process and a mass of air flushed through the internal combustion engine.

Owing to the mass of scavenging air $M_{Scav}$ not participating in the combustion process, the lambda $\lambda_{Ex}$ measured in the exhaust gas by means of the lambda probe 22 does not tally with the combustion lambda $\lambda_{Cyl}$. The following relationship applies:

$$TE \cdot \lambda_{Ex} = \lambda_{Cyl} \qquad (2)$$

The ratio that is optimal in terms of consumption and performance of the quantities of fuel to be injected MFF_1 and MFF_2 as well as the respective values for said quantities for the end-of-injection instants EOI_1 and EOI_2 are determined during operation under partial load and close to full load via ignition maps KF1, KF2:

$$MFF\_1 = MFF*KF(MAF\_KGH, N)$$

$$MFF\_2 = MFF - MFF\_1$$

$$EOI\_1 = EOI\_1(MAF\_KGH, N, FUP)$$

$$EOI\_2 = EOI\_2(MFF\_2, N, TCO, FUP) \qquad (3)$$

The quantity of fuel MFF_1 to be injected during the intake stroke is obtained thorough multiplying the total quantity of fuel MFF by a division factor read out from an ignition map KF as a function of the value of the mass of air MAF_KGH registered by the air mass meter 13 and of the speed N of the internal combustion engine. The quantity of fuel MFF_2 to be injected during the compressor stroke is obtained through forming the difference between the values for MFF and MFF_1. A typical division between the individual quantities of fuel MFF_1 and MFF_2 is for 80% of the total quantity of fuel MFF to be injected into the intake stroke and 20% into the compression stroke.

The value for the end-of-injection instant EOI_1 is read out from an ignition map KF1 as a function of the value MAF_KGH, the speed N of the internal combustion engine and the fuel pressure FUP.

The value for the end-of-injection instant EOI_2 is read out from an ignition map KF2 as a function of the value MFF_2, the speed N of the internal combustion engine, the coolant temperature TCO of the internal combustion engine and the fuel pressure FUP. This can be a three-dimensional ignition map or a combination of several, individual ignition maps.

If the air throughput rate is increased by means of scavenging when the internal combustion engine is operating close to full load (throttle fully open), there will be the possibility of predefining the reference values for the quantities to be injected MFF_1 and MFF_2 according to the trapping efficiency TE that has been set.

The term "range close to full load" is understood as being the range between full load in the case of aspirating operation, which is to say the maximum pressure achievable with a pure aspirating engine without boosting (intake manifold pressure same as ambient pressure, 1,000 hpascal) and maximum full load, which is to say the pressure achievable by means of boosting (2,000 hpascal, for example).

The quantity of fuel MFF_1 to be injected during the intake stroke is here dimensioned in such a way as to produce a stoichiometric combustion lambda $\lambda_{Cyl}$. The quantity of fuel MFF_2 to be injected during the compressor stroke is based on the requirement of a stoichiometric exhaust gas lambda $\lambda_{Ex}$.

$$MFF\_1 = MFF * TE$$

$$MFF\_2 = MFF - MFF\_1$$

$$EOI\_1 = EOI\_1(MAF\_KGH, N, FUP)$$

$$EOI\_2 = EOI\_2(MFF\_2, N, TCO, FUP) \qquad (4)$$

The quantity of fuel MFF_1 to be injected during the intake stroke is obtained thorough multiplying the total quantity of fuel MFF by the value for the trapping efficiency TE. The quantity of fuel MFF_2 to be injected during the compressor stroke is obtained through forming the difference between the values for MFF and MFF_1.

The values for the end-of-injection instants EOI_1 and EOI_2 are obtained from other ignition maps K4, K5 in a manner analogous to that described above on the basis of the equations (3).

What is termed knocking, which is to say uncontrolled combustion for example at hot spots in the combustion chamber, can occur while the internal combustion engine is operating. Variations in combustion pressure due to knocking combustion are as a rule detected by structure-borne noise sensors mounted on the crankcase. What is termed the knocking signal KNKS, characterizing the knocking noise of a cylinder during a power stroke, results after corresponding signal conditioning. Proceeding from said knocking signal KNKS, if combustion is free of knocking a floating mean value will be determined for each individual cylinder across all power strokes. This noise level NL, as it is termed, characterizes the engine noise level of a cylinder in the case of non-knocking combustion. By comparing the momentary noise level KNKS with a knocking threshold THD calculated from the noise level NL, it can be detected when knocking combustion occurs in a cylinder.

The known anti-knocking regulating methods correct the ignition angle of the affected cylinder in the "late direction" as a function of the knocking signal's KNKS exceeding the knocking threshold THD, as a result of which the tendency to knock is reduced. If a knocking event does not recur after an ignition angle correction has been performed on the knocking cylinder, the ignition angle intervention will be returned to zero via an integrator.

A disadvantage of said known methods is a displacement of the focal point for combustion in the "late direction" via the ignition angle intervention, giving rise to negative repercussions for fuel consumption and exhaust gas temperature.

According to one aspect of the invention, the tendency to knock is reduced by way of a corresponding division for each individual cylinder of the quantities $MFF\_1_{Cyl\_x}$ and $MFF\_2_{Cyl\_x}$ of fuel to be injected. Proceeding from the above-described reference injection values, the quantity of fuel $MFF\_2_{Cyl\_x}$ injected during the compressor stroke will be increased, with a corresponding decrease in the quantity of fuel $MFF\_1_{Cyl\_x}$ injected into the intake stroke, when knocking combustion begins.

Owing to the evaporation of the fuel in the combustion chamber, the increased second injection $MFF\_2_{Cyl\_x}$ injected into the compression stroke will result in additional internal charge cooling. Via the reduced maximum combustion temperature, this effect will reduce the tendency toward knocking combustion. The ignition angle will not need to be displaced in the direction of late. Consumption and exhaust gas temperature will not be negatively influenced.

If the knocking signal KNKS of a cylinder Cyl x exceeds the knocking threshold THD_1, then the quantity of fuel $MFF\_1_{Cyl\_x}$ for the individual cylinder will be reduced via a value $MFF\_DEC\_1_{Cyl\_x}$ and the quantity of fuel $MFF\_2_{Cyl\_x}$ for the individual cylinder increased. If the quantities of fuel to be injected were adjusted after the knocking threshold THD_1 had been exceeded and if the recurrence of a knocking event is not detected, then the intervention in the injection ratio will be returned via an integrator, so $MFF\_DEC\_1_{Cyl\_x}$ will again be incremented to 1.

$$MFF\_DEC_{Cyl\_x} = KF\_3(MAF\_KGH, N, KI)$$

$$MFF\_1_{Cyl\_x} = MFF\_1 \cdot MFF\_DEC_{Cyl\_x}$$

$$MFF\_2_{Cyl\_x} = MFF - MFF\_1_{Cyl\_x} \qquad (5)$$

The factor $MFF\_DEC\_1_{Cyl\_x}$ with which the quantity of fuel $MFF\_1_{Cyl\_x}$ for the individual cylinder is reduced is filed in an ignition map KF3 as a function of the mass of air MAF_KGH, the speed N of the internal combustion engine and the intensity of knocking KI, defined as the difference between the knocking signal KNKS and the knocking threshold THD_1.

The quantity of fuel $MFF\_1_{Cyl\_x}$ for the individual cylinder is obtained through multiplying the value for the quantity of fuel MFF_1 to be injected during the intake stroke by the factor, read from the ignition map, for the reduction. The quantity of fuel $MFF\_2_{Cyl\_x}$ for the individual cylinder is obtained through forming the difference between the values for MFF and $MFF\_1_{Cyl\_x}$.

If the knocking event is then so intense that a correction by way of the injection ratio is insufficient, further intervention via the ignition angle will be necessary. This eventuality will arise if the knocking signal KNKS exceeds a further knocking threshold THD_2, with THD_2>THD_1 being applied. Said further ignition angle intervention takes place as presented above in the description of the anti-knocking regulating method based on the ignition angle.

The two threshold values THD_1, THD_2 are determined experimentally for the internal combustion engine and are filed in the storage device 24.

The method according to the invention was explained on the basis of an internal combustion engine having an exhaust gas turbocharger as a boosting facility. The method is, however, independent of the nature of boosting and can be implemented using any other boosting devices such as compressors, including electric compressors, or a combination of the cited devices. The boosting device needs only to be suitable for generating an intake-side pressure which is greater than the pressure on the exhaust gas side so that scavenging is possible.

The invention claimed is:

1. A method for controlling an internal combustion engine, comprising:
   pre-compressing air fed to the combustion chambers of the internal combustion engine by a boosting device;

setting a valve overlap of gas exchange valves of the internal combustion engine by a variable camshaft displacement;

determining a quantity of fuel requiring to be injected for homogeneous operation of the internal combustion engine and injected directly into the combustion chambers of the internal combustion engine, dividing the quantity of fuel to be injected into two partial quantities;

injecting a first partial quantity into the intake stroke and a second partial quantity is injected into the compression stroke;

dividing a ratio with which the two partial quantities is determined as a function of the load range of the internal combustion engine and when the internal combustion engine is operating close to full load the valve overlap is set in such a way that fresh air is flushed toward the exhaust gas side of the internal combustion engine and the ratio with which the two partial quantities are divided is determined via the ratio of the mass of air remaining in the cylinder of the internal combustion engine to the total mass of air taken in during a working cycle.

2. The method as claimed in claim 1, wherein the quantity of fuel to be injected into the intake stroke is obtained through multiplying the total quantity of fuel by the ratio of the mass of air remaining in the cylinder of the internal combustion engine to the total mass of air taken in during a working cycle.

3. The method as claimed in claim 2, wherein the quantity of fuel to be injected into the compression stroke is obtained through forming the difference between the values for the total quantity of fuel and the quantity of fuel to be injected into the intake stroke.

4. The method as claimed in claim 2, wherein the value for the end-of-injection instant is determined as a function of the mass of air, the engine speed and the fuel pressure.

5. The method as claimed in claim 2, wherein that when knocking combustion occurs in a cylinder of the internal combustion engine the ratio with which the two partial quantities are divided will be changed for the individual cylinder.

6. The method as claimed in claim 5, wherein the quantity of fuel injected into the compression stroke will be increased and the quantity of fuel injected into the intake stroke will be reduced.

7. The method as claimed in claim 2, wherein the air is pre-compressed by means of an exhaust gas turbocharger.

8. The method as claimed in claim 2, wherein the air is pre-compressed by means of a compressor driven directly or indirectly by the internal combustion engine.

9. The method as claimed in claim 2, wherein the air is pre-compressed by an electrically driven compressor.

10. The method as claimed in claim 2, wherein the camshaft is displaced continuously.

11. The method as claimed in claim 2, wherein the camshaft is displaced in stages.

* * * * *